May 23, 1961 R. D. FAGGE 2,985,140
HYDRAULIC SPOT WELDING GUN MOTOR
Filed June 20, 1958
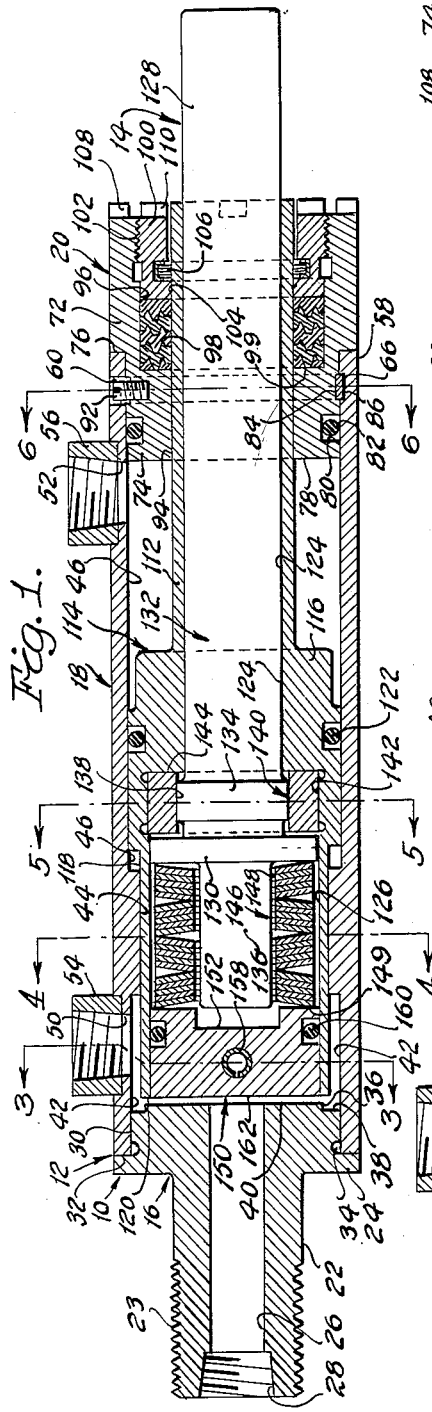
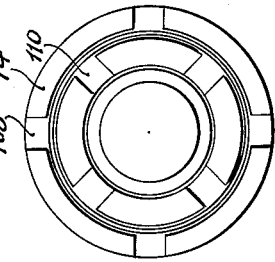
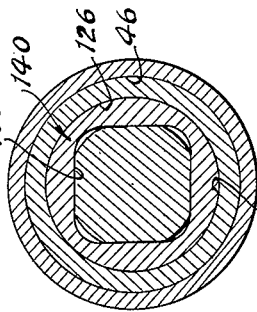
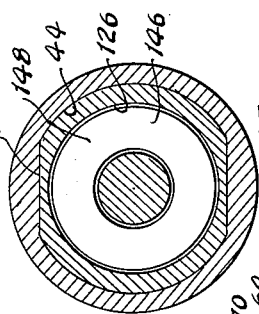
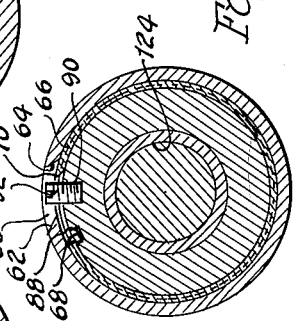
INVENTOR.
RALPH D. FAGGE, DECEASED
BY SOPHIE A. FAGGE,
ADMINISTRATRIX
BY Barthel + Bugbee
Attys

United States Patent Office 2,985,140
Patented May 23, 1961

2,985,140

HYDRAULIC SPOT WELDING GUN MOTOR

Ralph D. Fagge, deceased, late of 4021 E. Outer Drive, Detroit 34, Mich., by Sophie A. Fagge, administratrix, Detroit, Mich.

Filed June 20, 1958, Ser. No. 743,312

7 Claims. (Cl. 121—38)

This invention relates to welding apparatus and, in particular, to spot welding guns.

One object of this invention is to provide a hydraulic spot welding gun actuating motor wherein the internal moving and working parts can be removed from the cylinder thereof without disturbing the cylinder or removing the latter from its mounting, if mounted in a fixture, thereby enabling these internal parts to be removed instantly as a unit and replaced by another similar unit without interrupting production more than momentarily and without the necessity for disconnecting any hoses or cables from the cylinder.

Another object is to provide a hydraulic spot welding gun actuating motor of the foregoing character wherein the internal unit so removed as a unit can be further disassembled and repaired at leisure at the work bench or other suitable location without the necessity of working upon it at the location of the gun upon the assembly line.

Another object is to provide a hydraulic spot welding gun actuating motor of the foregoing character which possesses an exceptionally low inertia or frictional drag and which provides a rapid followup action upon softening of the metal under the welding heat, because of the fact that the necessity for a packing between the inner and outer piston rods has been eliminated and also because of the fact that no hydraulic fluid can enter the follow-up spring chamber or the piston rod bore.

Another object is to provide a hydraulic spot welding gun actuating motor of the foregoing character wherein the followup spring washers are mounted in the rearward end of the cylinder where the structural strength of the cylinder is at a maximum.

Another object is to provide a hydraulic spot welding gun actuated motor of the foregoing character wherein the rotation-preventing device of the piston is also mounted in the rearward end of the cylinder where the structural strength of the cylinder is at a maximum.

Other objects and advantages of the invention will become apparent during the course of the following description of the accompanying drawings, wherein:

Figure 1 is a central longitudinal vertical section through a hydraulic spot welding gun actuating motor of the fixture-mounted type, according to one form of the invention;

Figure 2 is a right-hand end elevation of the hydraulic spot welding gun actuating motor shown in Figure 1; and Figures 3, 4, 5 and 6 are vertical cross-sections taken at longitudinally-spaced planes along the lines 3—3, 4—4, 5—5 and 6—6 respectively in Figure 1.

Referring to the drawings in detail, Figure 1 shows a hydraulic spot welding gun actuating motor, generally designated 10, according to one form of the invention as including a cylinder assembly, generally designated 12 and a compound piston unit, generally designated 14, mounted therein for rapid insertion and removal. The cylinder assembly 12 in turn consists of a cylinder head, generally designated 16, and a cylinder barrel, generally designated 18, welded, brazed or otherwise secured thereto and closed at its open end by a removable cylinder head unit, generally designated 20. The cylinder head 16 is provided with a tubular support 22 with an externally-threaded end portion 23 which projects from a radial cylinder end wall 24 perpendicular to the axis of the stem 22 and the bore or fluid passageway 26 therein. The bore 26 has a threaded service port 28 for the connection of a pipe leading by way of a conventional hydraulic control valve (not shown), such as a conventional four-way valve, to a source of hydraulic pressure fluid, such as a conventional hydraulic pump (also not shown).

The end wall 24 is provided with an annular reduced diameter portion 30 (Figure 1) providing an annular radial shoulder or abutment surface 32 against which the end of the cylinder barrel 18 abuts, an annular groove 34 being provided for facilitating a welding or brazing operation securing the parts 16 and 18 to one another, in a manner simulating their production from a single piece of metal. The reduced diameter portion 30 is a substantially cylindrical surface which terminates in a further reduced diameter portion 36 providing an annular space 38 adjacent an abutment end surface 40 for the piston of the assembly 14, as explained more fully below. The reduced diameter portion 30 fits snugly into a rearward cylindrical cylinder bore 42 within the cylinder barrel 18 (Figure 3), this in turn opening at its forward end into an oppositely-flattened partially-cylindrical intermediate bore 44 (Figure 4), the latter in turn opening at its forward end into a cylindrical forward cylinder bore 46 (Figure 5). The flattened bore 44, as its name signifies (Figure 4) has substantially parallel flat elongated surfaces or lands 48 diametrically opposite one another for the purpose of preventing rotation of the piston assembly 14 relatively to the cylinder assembly 12, as explained more fully below.

The rearward and forward cylinder bores 42 and 46 are provided with counterbored rearward and forward service ports 50 and 52 within the counterbores of which are secured, as by welding, internally-threaded pipe couplings or connection members 54 and 56. The cylinder barrel 18 near its forward end 58 is provided with a circumferentially-elongated hole or slot 60 (Figures 1 and 6) having outwardly-beveled and inwardly-beveled opposite ends 62 and 64 respectively for facilitating the insertion and removal of a flexible elongated coupling band 66 of steel or the like having an inwardly-hooked rearward end 68 and an inwardly-beveled forward end 70, the latter cooperating with the beveled end 62 of the elongated circumferential slot 60.

The removable cylinder head unit 20 is of generally cylindrical form and has a hollow cylindrical head 72 with a reduced diameter cylindrical portion 74 adapted to fit snugly into the forward end of the forward cylinder bore 46 (Figure 1) and with an annular shoulder 76 therebetween abutting the end surface 58 of the cylinder barrel 18. The reduced diameter portion 74 is provided near its inner end 78 with a deep annular groove 80 for receiving a conventional O-ring 82 and a shallow external annular groove 84 having a depth approximately half the thickness of the coupling band 66, the other half being received within a correspondingly shallow annular internal groove 86 in the cylinder barrel 18 near the forward end 58 thereof. The external annular groove 84 is provided with a radial recess 88 for receiving the hooked inner end 68 of the coupling band 66 and also with a threaded radial hole 90 threadedly receiving a headless set screw 92 (Figures 1 and 6) inserted through the circumferential slot 60, the coupling band 66 being of slightly less circumferential extent than the reduced diameter portion 74 so as to leave a gap between its opposite ends 70 and 68 through which the set screw 92 may be inserted.

The removable cylinder head 72 is provided with an inner bore 94 and an enlarged outer bore or counterbore 96 with an anular piston rod packing 98 seated in the outer bore 96 and compressed against an annular shoulder 99 therebetween by a gland 100 threaded into the threaded outer end portion 102 of the outer bore 96. The gland 100 is provided with a bore 104 of similar diameter to the bore 94 and internally-grooved to receive a conventional oil seal 106. The outer ends of the cylinder head 74 and gland 100 are radially notched as at 108 and 110 respectively (Figures 1 and 2) for the insertion and application of conventional spanner wrenches.

The compound piston unit 14 includes a hollow piston rod 112 reciprocably mounted within the bores 94 and 104 of the cylinder head 72 and gland 100. The hollow piston rod 112 constitutes the forward portion of the tubular outer piston, generally designated 114, which has a tubular or annular head 116 of circular cross-section intermediate its opposite ends but with elongated flat parallel surfaces or lands 118 extending rearwardly therefrom to the rearward end 120 thereof, and snugly but slidably engaging the flat parallel lands 48 in the intermediate cylinder bore portion 44. The piston head 116 is externally grooved to receive a conventional O-ring 122 and the piston rod 112 and piston head 116 of the piston 114 are provided with a central elongated bore 124 (Figures 1 and 6) opening into an enlarged cylindrical counterbore or chamber 126 at the rearward end thereof (Figures 3, 4 and 5). Mounted for limited reciprocation within the bores 124 and 126 are the solid plunger rod 128 and main head or abutment portion 130 of an inner plunger, generally designated 132, the latter also having an intermediate guide head 134 of reduced diameter compared with the main head 130 and a further reduced diameter elongated stem 136 projecting rearwardly from the main head 130. The guide head 134 (Figure 5) is of square cross-section with rounded corners and snugly yet slidably fitts a bore 138 of corresponding size and rounded corner square cross-section within a guide collar or annular guide member, generally designated 140. The latter has a substantially cylindrical outer surface 142 snugly fitting the forward end of the bore 126 within the piston head 116 and abutting the annular shoulder 144 therebetween (Figure 1). The guide collar 140 is brazed, silver-soldered, welded or otherwise secured in the bore 126, which is internally grooved to facilitate such securing.

Mounted on the stem 136 of the inner plunger 132 within the counterbore or chamber 126 are sets 146 (Figures 1 and 4) of convexo-concave spring washers 148 commonly known in the machine industry as Belleville washers with the concave surface of the forward washer 148 of the forward set 146 abutting the main head 130 of the inner plunger 132 and with the concave surface of the rearmost washer of the rearmost set abutting the inner annular abutment surface 149 of a cylindrical closure plug, generally designated 150 (Figures 1 and 3), which has a central recess 152 providing clearance for the end of the stem 136. The spring washers 148 are held in a compressed condition by the plug 150, urging the head 130 forwardly. The plug 150 is of such diameter as to snugly yet removably fit into the rearward or outer end of the enlarged bore 126 and it and the piston head 116 are drilled diametrically in alignment at 154 and 156 respectively (Figure 3) to receive the longitudinally-split tubular roll pin or coupling pin 158. The plug 150 is externally-grooved to receive a conventional O-ring 160, and has a rearward surface 162 forming the major part of the rearward end of the piston head 116.

In the operation of the invention, let it be assumed that the tubular support 22 of the cylinder 12 has been mounted in a suitable location in a welding fixture (not shown) and secured thereto by convention nuts threaded onto the threaded portion 23 thereof. Let it also be assumed that the forward service port 52 and one or the other of the rearward service ports 50 or 28 have been connected to corresponding service ports in the conventional control valve interposed between the cylinder 12 and the remainder of the hydraulic circuit including the hydraulic pump (not shown) or other source of hydraulic pressure fluid. The ports 50 and 28 are not used simultaneously but are provided for convenience of adaptation to the particular set-up, the port not used being closed by a threaded plug (not shown). Let it be further assumed that a welding electrode holder containing a movable welding electrode has been mounted on the outer or forward end of the inner or solid piston rod 128, the electrode being connected by a conventional jumper or conductor to a welding cable (also not shown) and opposed to a corresponding fixed electrode (also not shown) spaced away from the first-mentioned electrode to provide a gap for the work to be welded, for example, a pair of sheet metal plates or panels to pass therebetween.

Let it be murther assumed that the movable and fixed electrodes have also been connected by conductors or welding cables to a conventional welding transformer, and that a pair of sheet metal workpieces have been inserted in the gap between the electrodes. To make a weld, the operator shifts the hydraulic control valve to admit hydraulic pressure fluid to the rearward bore 42 of the cylinder 12 by way of the rearward service port 50 or 28 (whichever is in use), the same action connecting the forward service port 52 to the suction side of the pump. This action causes pressure fluid to act upon the rearward end of the piston head 116, represented mainly by the rearward surface 162 of the plug 150, moving the outer and inner pistons 114 and 132 forwardly to the right within the cylinder bore 46, causing the movable electrode upon the inner or solid piston rod 128 to be engaged with one of the workpieces, squeezing the workpieces together against the fixed electrode and at the same time causing the welding current to flow between the electrodes and through the intervening workpieces or workpiece parts.

Meanwhile, the engagement of the flat lands or surfaces 118 of the piston head 116 with the corresponding flat lands 48 within the intermediate bore 44 of the cylinder barrel 18, and the simultaneous engagement of the rectangular portion 134 of the inner piston 132 with the square bore 138 in the guide collar 140 cooperates with one another to prevent rotation of the piston rod 128 and the movable electrode carried thereby relatively to the cylinder barrel 18 of the cylinder 12. Contact of the movable electrode with the workpieces in this manner causes the inner piston rod 128 to halt momentarily, compressing the spring washers 138 as the outer piston 114 continues to advance.

The closing of the electric welding circuit and the consequent flow of low-voltage high-amperage welding current between the electrodes creates a sudden surge of intense heat at the point of engagement between the electrodes and the workpieces, softening or melting the metal of the workpieces. When this occurs, the previously-compressed sets 146 of spring washers 148 expand suddenly, thrusting the inner piston 132 forwardly relatively to the outer piston 116 and providing a quick-action follow-up to the movable electrode as the metal melts, before the electrodes reverse and separate during the hammering action thereof, resulting from the rapid reciprocation of the pistons 114 and 132, as is well understood by those skilled in the art of welding by means of spot welding guns. Since there is no liquid entering the counterbore 126 containing the spring washers 148, no seal is required around the plunger rod 128, and consequently the follow-up plunger 132 moves instantly, without the frictional drag imposed by such a seal.

If a defect or breakage occurs in the spot welding gun 10, the piston-and-follow-up assembly 14 can be quickly and easily removed and a duplicate installed without disturbing the mounting of the cylinder 12 upon the welding fixture and without disconnecting the welding cables or hydraulic hoses or piping. The operator or repair man removes the set screw 92 and applies a spanner wrench to the notches 108 to rotate the hollow cylindrical head 74 counterclockwise relatively to the cylinder barrel 18 (Figure 6). This action causes the beveled end 70 of the coupling band 66 to engage the beveled end 62 of the arcuate slot 60 and to slide outward therethrough in a direction intermediate the radial and tangential directions. Rotation of the outer hollow cylindrical head 74 by slightly less than a full revolution causes the coupling band 66 to be completely ejected through the slot 60 from its annular recesses 84 and 86, permitting disengagement of the hooked end 68 thereof from the recess 88 (Figure 6). Complete withdrawal of the coupling band 66 and a pull upon the outer or forward end of the inner piston rod 128 causes the entire piston and follow-up unit 14 to be withdrawn from the cylinder barrel 18. A similar replacement unit 14 can then be inserted in the cylinder barrel 18 and welding operations resumed with a minimum of lost time, the coupling band 66 being inserted in the aligned grooves 84 and 86 by following the reverse procedure from that described above.

To disassemble the piston-and-follow-up unit 14, the repair man slides the removable cylinder head unit 20 off the outer hollow piston rod 112, whereupon the removal of the roll pin 158 from its aligned holes 154 and 156 enables the plug 150 to be withdrawn from the end of the bore 126, permitting the inner piston 132 and the sets 146 of spring washers 148 to be removed from their locations within the bores 124 and 126 of the outer hollow piston 114. Any necessary repairs or replacements can then be made and the parts reassembled by reversing the above-described procedure.

What is claimed is:

1. A hydraulic spot welding gun motor comprising a cylinder having therein a cylinder bore open at its forward end and having an end wall closing its rearward end, a cylinder head unit removably mounted in said open end of said cylinder in closing relationship with said cylinder bore and having a central opening therethrough, and a compound piston unit reciprocably mounted in said cylinder bore; said compound piston unit including a hollow piston having a hollow piston head reciprocably engaging said cylinder bore and a hollow piston rod extending forwardly therefrom through said opening, said cylinder having axially-spaced forward and rearward pressure fluid service ports therein near said forward and rearward ends respectively on opposite sides of said piston head and effecting advancement and retraction of said compound piston unit relatively to said cylinder in response to the supplying of pressure fluid alternately to said service ports, said piston rod having a longitudinal bore therethrough and said piston head having therein a counterbore opening into said piston rod bore, a plunger having thereon an abutment portion larger than said piston rod bore reciprocably mounted within said counterbore and having a plunger rod extending through said piston rod bore with its outer end projecting exteriorly therefrom for connection to a welding electrode, resilient means mounted in said counterbore in yielding engagement with said abutment portion of said plunger and a hollow piston head closure member removably secured in said counterbore rearwardly of said resilient means in abutting engagement therewith, said closure member cooperating with said hollow piston head and with said plunger abutment portion to retain said resilient means and said plunger in assembly with said hollow piston whereby to render said compound piston unit a package unit insertable and removable unitarily from said cylinder bore and replaceable unitarily in said cylinder bore with another package unit comprising a duplicate compound piston unit upon removal of said cylinder head unit from said cylinder.

2. A hydraulic spot welding gun motor, according to claim 1, wherein a removable fastener passes through said closure member and said hollow piston in coupling relationship therebetween.

3. A hydraulic spot welding gun motor, according to claim 1, wherein said resilient means includes a plurality of convexo-concave spring washers disposed coaxial with said plunger.

4. A hydraulic spot welding gun motor, according to claim 3, wherein said plunger has a head yieldingly engaged by said spring washers and a stem extending rearwardly from said plunger head through said washers.

5. A hydraulic spot welding gun motor, according to claim 1, wherein said cylinder bore near said end wall and said hollow piston head have flattened guide surfaces extending axially therealong in relatively sliding guiding engagement with one another.

6. A hydraulic spot welding gun motor, according to claim 1, wherein said hollow piston head has a guide bore with a flattened internal guide surface extending axially therealong and wherein said plunger has a flattened external guide surface thereon slidably engageable with said flattened internal guide surface.

7. A hydraulic spot welding gun motor, according to claim 5, wherein said hollow piston head has a guide bore with a flattened inernal guide surface extending axially therealong and wherein said plunger has a flattened external guide surface thereon slidably engageable with said flattened internal guide surface.

References Cited in the file of this patent
UNITED STATES PATENTS

| | | |
|---|---|---|
| 1,954,427 | Platz | Apr. 10, 1934 |
| 2,851,994 | Fagge | Sept. 16, 1958 |
| 2,853,857 | Macewka | Sept. 30, 1958 |
| 2,891,513 | Fagge | June 23, 1959 |